N. B. SANDS.
RELIEF VALVE.
APPLICATION FILED MAR. 30, 1912.
1,214,595.
Patented Feb. 6, 1917.
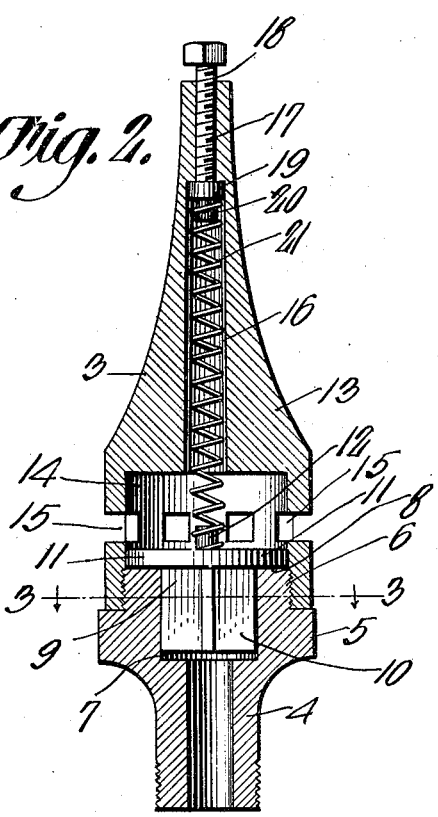
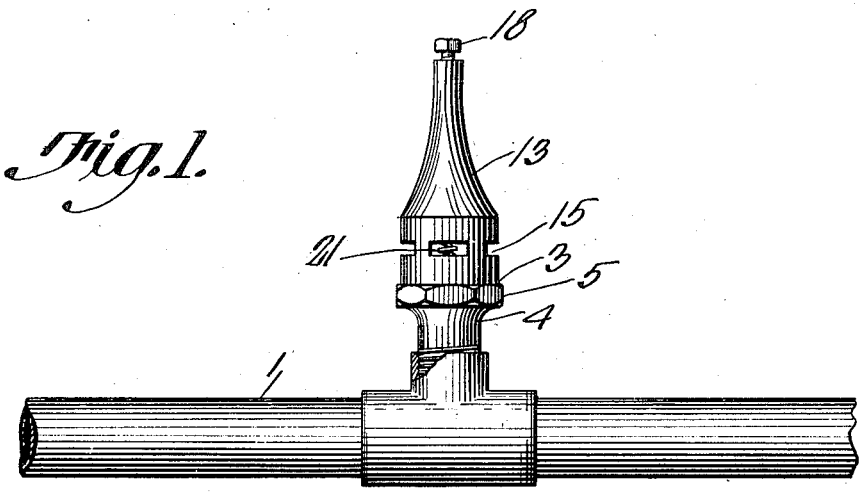
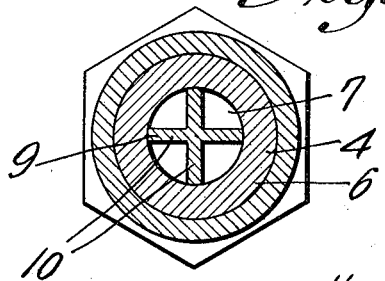
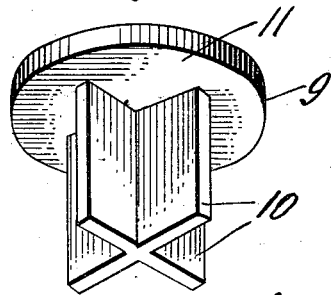
N. B. Sands, Inventor
by C. A. Snow & Co., Attorneys
Witnesses

UNITED STATES PATENT OFFICE.

NATHAN B. SANDS, OF BALTIMORE, OHIO.

RELIEF-VALVE.

1,214,595.  Specification of Letters Patent.  Patented Feb. 6, 1917.

Application filed March 30, 1912. Serial No. 687,381.

*To all whom it may concern:*

Be it known that I, NATHAN B. SANDS, a citizen of the United States, residing at Baltimore, in the county of Fairfield and State of Ohio, have invented a new and useful Relief-Valve, of which the following is a specification.

The present invention relates to improvements in relief valves, the primary object of the invention being the provision of a novel form or valve adapted to be disposed in a pipe line and so constructed and arranged as to relieve any undue pressure therein due to the freezing of the liquid within the pipe, and thereby prevent the bursting of the pipe during exceedingly cold weather.

With the foregoing and other objects which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the relief valve in operable relation to a pipe line. Fig. 2 is a vertical central sectional view through the valve. Fig. 3 is a section taken on line 3—3 of Fig. 2. Fig. 4 is a perspective view of the disk wing valve employed.

Referring to the drawings, the numeral 1 designates the pipe line for conveying either hot or cold water and has connected therein a T-coupling disposed invertedly for the reception of the relief valve 3, which is preferably disposed in a vertical position. This valve consists of the lower coupling member 4, whose lower reduced end is adapted to be threaded into the upper nipple of the T-coupling and is provided with the shouldered portion 5 to permit of the easy assembling of the valve with relation to the coupling. The exteriorly threaded ring 6 provides a proper connection for the coupling 4, while the coupling 4 is provided with the enlarged chamber 7 and with the valve seated portion 8 for the reception of the wing valve 9 which is provided with the guiding wings 10 and valve disk 11, as clearly shown in Fig. 4. Upon the opposite side of the disk concentrically thereof is a stud 12, the purpose of which will presently appear.

The upper member 13 of the relief valve is provided with the lower chambered portion 14 which fits upon the threaded portion 6 of the coupling 4 and constitutes a chamber above the disk portion 11 of the wing valve 9 provided with a plurality of apertures 15 which provide eduction ports for the water when the wing valve 9 is actuated due to the increased pressure within the pipe line 1. The upper member 13 is provided with the concentrically disposed cylindrical socket 16 which terminates in the reduced threaded bore 17 for the reception of the adjusting screw 18, said adjusting screw having its lower end disposed to abut the headed stud 19 whose reduced end 20 is disposed in opposition to the stud 12 of the wing valve 9 and provides with the stud 12 the proper holding means for the respective terminals of the coil spring 21 which is disposed within the concentric bore 16 of the valve member 13. By this means the screw 18 may be adjusted to exert any desired tension upon the spring 21 and thus resiliently hold the wing valve 9 seated within the enlarged portion 7 of the coupling 4 and upon the valve seat rim 8 thereof, the tension of the spring being such as to ordinarily prevent the pressure within the line pipe 1 from lifting the wing valve 9, but which however, due to any abnormal increased pressure within the pipe line 1, due to the freezing of the water within the pipe at or near the relief valve, will cause the lifting of the wing valve and thereby permit the liquid to escape through the aperture 15 and thus relieve the abnormal pressure within the pipe line 1 and thus prevent the bursting of the pipe at its weakest point.

It will be noted by referring particularly to Fig. 2 that the length of valve 9 from the top of the disk 11 to the bottom of the wings 10 is slightly greater than the length of the chamber 14. Thus when the valve is completely unseated and is bearing against the upper end of the chamber 14, the wings 10 are still positioned within the chamber 7 so that vibration of the valve or displacement thereof is prevented.

What is claimed is:

The combination with a pipe having a T-joint, of a pressure relief valve comprising a coupling member engaging said joint and having an exteriorly screw threaded reduced portion, there being a counter bore within said member, the end of the reduced portion constituting a valve seat, an interiorly threaded chambered member detachably engaging the reduced threaded portion of the first named member and having an annular series of outlet openings, there being a recess extending longitudinally within said chambered member and communicating with the chamber therein, a spring seated snugly within said recess, a valve including a disk and wings extending therefrom, said spring normally bearing against the disk to hold it upon the seat and said wings being slidably mounted within the counter bore in the coupling member, the length of the chamber being less than the length of the valve whereby the lower ends of the wings of the valve are maintained constantly within the counter bore, and means adjustably mounted in the end wall of the recess for varying the compression of the spring, the recess being of such length that the spring serves also as a guide for the valve.

In testimony that I claim the foregoing as my own, I have hereto affixed my signature in the presence of two witnesses.

NATHAN B. SANDS.

Witnesses:
ELDON O. WEIST,
ERNEST BYER.